United States Patent [19]

Begun et al.

[11] Patent Number: 5,170,481
[45] Date of Patent: Dec. 8, 1992

[54] MICROPROCESSOR HOLD AND LOCK CIRCUITRY

[75] Inventors: Ralph M. Begun, Boca Raton; Patrick M. Bland; Mark E. Dean, both of Delray Beach, all of Fla.

[73] Assignee: International Business Machines Corporation, Armonk, N.Y.

[21] Appl. No.: 367,828

[22] Filed: Jun. 19, 1989

[51] Int. Cl.⁵ .............................................. G06F 13/00
[52] U.S. Cl. .................. 395/725; 364/242.92; 364/DIG. 1; 364/937.01; 364/926.91; 364/DIG. 2
[58] Field of Search .................. 364/200, 900; 395/725

[56] References Cited

U.S. PATENT DOCUMENTS

| | | | |
|---|---|---|---|
| 4,547,849 | 10/1985 | Louie et al. | 395/325 |
| 4,611,297 | 9/1986 | Dudley et al. | 364/900 |
| 4,729,090 | 3/1988 | Baba | 364/200 |
| 4,779,089 | 10/1988 | Theus | 364/200 X |
| 4,787,032 | 11/1988 | Culley | 364/200 |
| 4,807,112 | 2/1989 | Hamasaki | 364/200 |
| 4,987,529 | 1/1991 | Graft et al. | 364/200 |

*Primary Examiner*—Michael R. Fleming
*Assistant Examiner*—Glenn A. Auve
*Attorney, Agent, or Firm*—Martin J. McKinley

[57] ABSTRACT

A logic circit external to a microprocessor monitors selected processor I/O pins to determine the current processor cycle and, in response to a hold request signal, drives the processor into a hold state at the appropriate time in the cycle. The logic circuit also includes a "lockbus" feature that, when the processor is not idle, "locks" the microprocessor to the local CPU bus for a predetermined period of time immediately after the processor is released from a hold state.

16 Claims, 2 Drawing Sheets

MICROPROCESSOR HOLD AND LOCK CIRCUITRY

BACKGROUND of the INVENTION

This invention pertains to computer circuits and, more particularly, to a logic circuit for placing a microprocessor in a hold state in response to a hold request signal, and for locking the microprocessor to the local central processing unit (CPU) bus for a predetermined minimum period of time.

The Intel family of microprocessors, including the 80286, 80386 and 80486, support a common interface to allow other devices access to the local CPU bus. These other devices are typically other processors, such as direct memory access (DMA) controllers, which require access to the local CPU bus.

The Intel microprocessor has a HOLD input pin for receiving a "hold request" from the device that requires access to the CPU bus. The processor responds to this request by releasing or "floating" the local CPU bus, to allow the requesting device temporary control of the bus. Upon releasing the bus, the microprocessor asserts its HOLDA ("Hold Acknowledge") pin active to notify the requesting device that the bus has been released. The microprocessor does not respond instantaneously when a hold request is asserted at the HOLD pin, but waits for the end of the current local bus cycle or the end of an "atomic" transfer. (An atomic transfer is a transfer of a predetermined number of bytes of code.) The HOLDA pin will remain in the active state until the requesting device removes the hold request from the HOLD pin. When HOLD goes inactive, the microprocessor will inactivate HOLDA and retake control on the local CPU bus.

Thus, the device requesting control of the local CPU bus must wait until the microprocessor completes its current bus cycle or atomic transfer. This period of time between the hold request and the time the microprocessor acknowledges that it has released the bus is known as "hold latency".

Typically, the longest hold latency period occurs when the hold request is asserted at the beginning of an atomic transfer. In the earlier generation of Intel processors, atomic transfers were only 2 or 4 bytes and hold latency was not a problem.

The 80486 processor, however, treats all memory code reads (code prefetches) as 16 byte atomic transfers. If the processor is executing code from an eight (8) bit device on the extended CPU bus, a latency period on the order of eight (8) microseconds may result (16 bytes×0.5 microseconds/byte=8 microseconds). This creates a problem in personal computer systems wherein a hold latency on the order of 8 microseconds has been known to create errors, such as diskette overruns, due to the length of time that the requesting device must wait for access to the local CPU bus.

Accordingly, the invention described below is an external (external to the microprocessor) logic circuit, suitable for use with an Intel 80486 or other microprocessor, that shortens the hold latency period inherent in the internal HOLD/HOLDA circuitry of the 80486 processor. The invention uses programmable array logic (PAL) to determine the current state of the microprocessor by monitoring the processor's I/O pins, and the PAL generates a signal (BCKOFF) in response to a hold request that places the microprocessor in an immediate hold state. The PAL also generates a hold acknowledge signal.

The invention also provides a "lockbus" feature that "locks" the microprocessor, when not idle, to the local CPU bus for a predetermined minimum period of time. This lockbus feature insures that the CPU has adequate access to the local CPU bus.

BRIEF DESCRIPTION of the DRAWINGS and TABLES

TABLE 1-A is a list of logical equations that define the functions performed by the programmable array logic (PAL) of the present invention.

TABLE 1-B is a list of signal definitions. Signal names enclosed in parenthesis are the equivalent Intel signal names as defined in the 80486 specification.

DESCRIPTION of the PREFERRED EMBODIMENT

Figure 1:
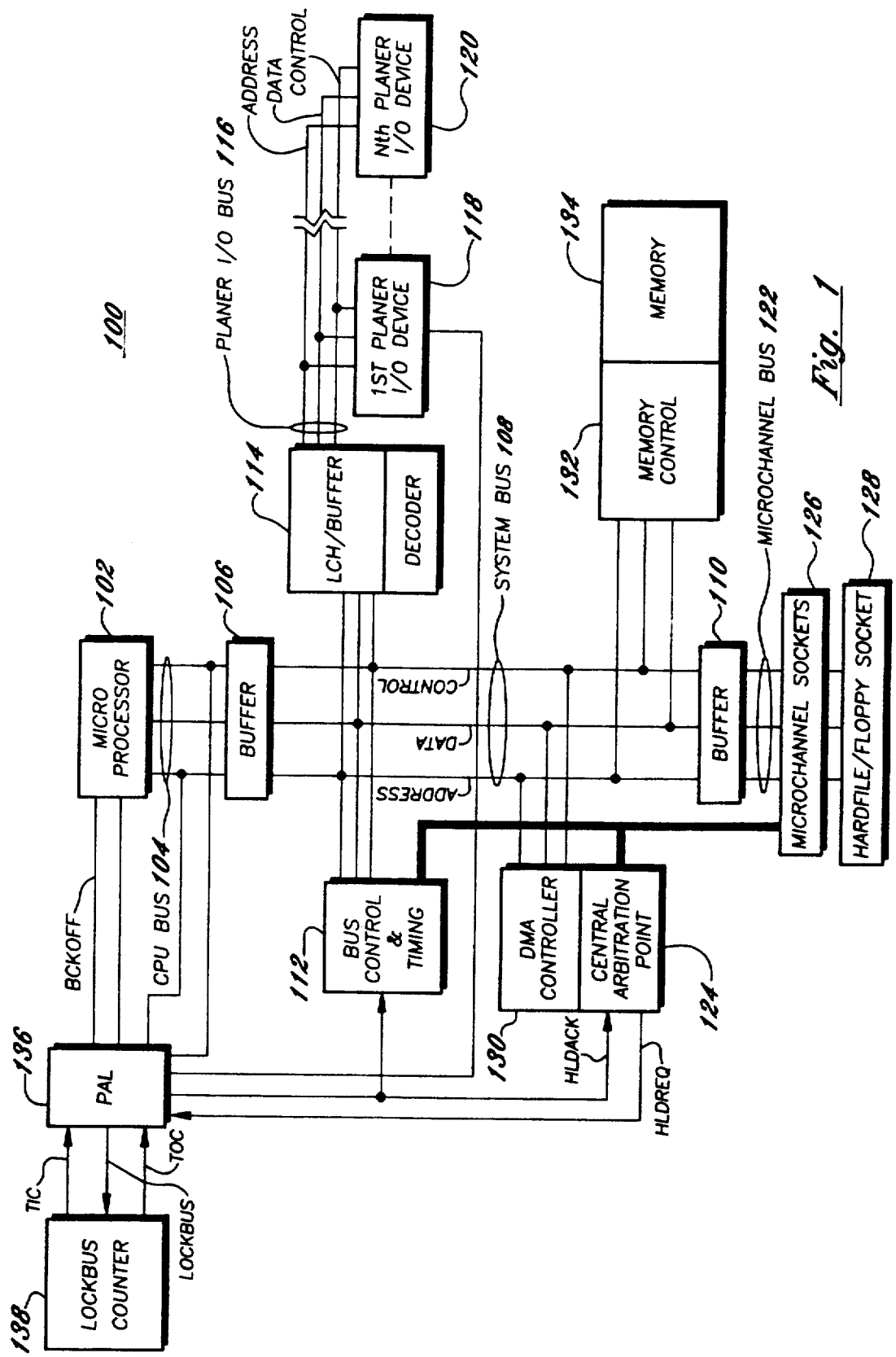
FIG. 1 is a block diagram of a computer system that incorporates the microprocessor hold and lock circuitry of the present invention.

FIG. 1 is a block diagram of a computer system that includes the present invention. Referring to this figure, Computer System 100 includes a processor 102, preferably an Intel 80486 microprocessor. A Local CPU Bus 104 includes an address bus, a data bus and a control bus, which are coupled between processor 102 and a buffer 106. System 100 also includes a System Bus 108 coupled between buffer 106 and a buffer 110. System Bus 108 also includes an address bus, a data bus and a control bus.

System 100 includes a well known Bus Control and Timing Circuit 112 which is coupled to the address, data and control buses of System Bus 108. System Bus 108 is coupled via a well known Latch/Buffer/Decoder 114 to an Input/Output (I/O) Bus 116, which also includes an address bus, a data bus and a control bus. I/O Bus 116 is coupled to a plurality of Planar I/O Devices (only the first 118 and the "nth" 120 I/O device are illustrated in FIG. 1). These I/O Devices may be RS232 adapters, printer adapters, diskette adapters, interrupt controllers, read only memories (ROM's), or other well known I/O devices.

A well known Micro Channel (TM) Bus 122 having address, data and control buses therein is coupled to system bus 108 via buffer 110. The architecture of the Micro Channel Bus is described in more detail in the IBM PS/2 Model 80 Technical Reference Manual. In accordance with the Micro Channel architecture, a well known Central Arbitration Control Point (CACP) 124 is coupled to Micro Channel Bus 122 and Bus Control and Timing Circuit 112 for purposes of managing the Micro Channel multi-device bus arbitration mechanism. The connection of Central Arbitration Point 124 and Bus Control and Timing Circuit 112 actually forms part of the Micro Channel Bus 122.

A plurality of Micro Channel sockets 126 are coupled to Micro Channel Bus 122 for receiving adapter cards such as memory cards, video cards, communication cards, etc. One or more hard disk/ floppy disk sockets 128 are coupled to Micro Channel Bus 122 to facilitate connection of a hard disk or floppy disk (not illustrated) to Bus 122. A well known Direct Memory Access (DMA) Controller 130 is coupled to the address, data and control buses of System Bus 108 for the purpose of permitting peripherals, such as hard disk drives, floppy disk drives and any Micro Channel DMA slave device, to have direct access to memory 134 to avoid the direct involvement of processor 102 in data transfers between such peripherals and the memory. A well known Memory Control Circuit 132 and associated Memory 134 are also coupled to System Bus 108 as shown in FIG. 1.

A well known Programmable Array Logic (PAL) Circuit 136 is coupled between microprocessor 102, Local CPU Bus 104, a Planar I/O Device (e.g., 118), Bus Control and Timing Circuit 112, and Central Arbitration Control Point 124. The functions programmed into PAL 136 are shown in detail in Table-1A, while the signal definitions are described in Table-1B.

The "hold request" signal output of Central Arbitration Control Point 124, which was formerly coupled to the HOLD input of the microprocessor in the prior art computer system, is now coupled to PAL 136 and labeled "HLDREQ" in the figures. The HOLD input of microprocessor 102 is unterminated in the present invention (more specifically, it is forced to the inactive state). In its place, PAL 136 generates a "backoff" signal BCKOFF that is connected to the BOFF input of microprocessor 102. When the BOFF pin of microprocessor 102 is asserted active, the 80486 processor will immediately release control of the Local CPU Bus, regardless of the state of the current processor bus cycle. Note that the function of the processor's BOFF input is different from that of the HOLD input. When the HOLD input is asserted active, as in the prior art system, and the processor is currently executing an atomic transfer cycle, the processor waits until the atomic transfer is complete before releasing control of the bus.

Similarly, the "hold acknowledge" (more specifically, HOLDA) output of microprocessor 102, which was formerly connected to the Central Arbitration Control Point 124 in the prior art computer system, is unterminated in the present invention. In its place, PAL 136 generates a HLDACK signal, which is coupled back to Central Arbitration Control Point 124 and Bus Control and Timing Circuit 112.

A Lockbus Counter/Timer 138 is coupled to PAL 136. The Lockbus signal establishes a predetermined minimum amount of time that a non-idle processor will be "locked" to the local CPU bus.

Figure 2:
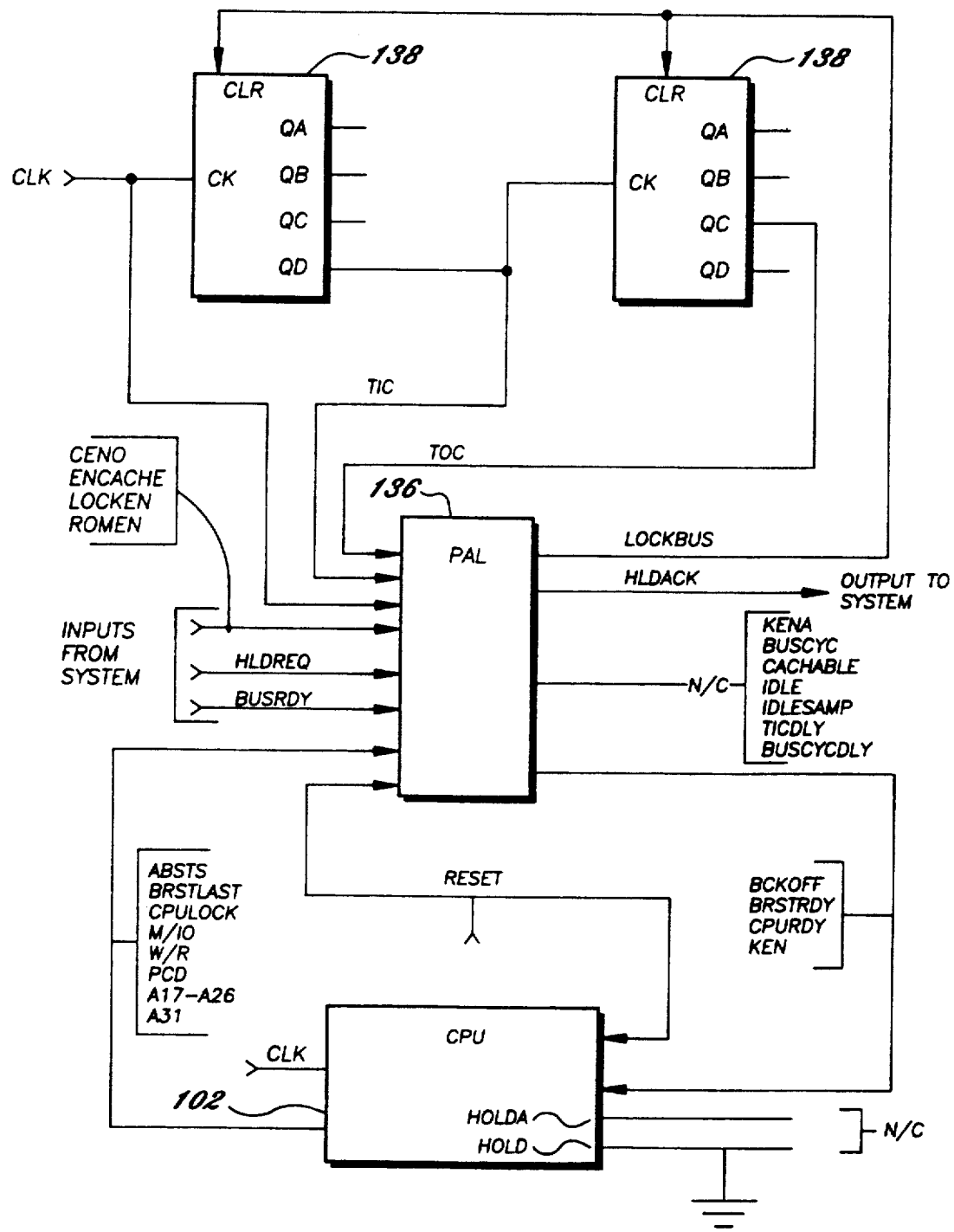
FIG. 2 is a schematic diagram of the microprocessor hold and lock circuitry of the present invention.

Further details of the interconnection of PAL 136 and Lockbus Counter/Timer 138 with Computer System 100 are illustrated in the schematic diagram of FIG. 2. Referring to this figure, Lockbus Counter/Timer 138 is preferably a 74F393 integrated circuit counter, although other well know counter circuits may also be suitable. The clock input (first section only) of Counter/Timer 138 is coupled to the CPU system clock. When LOCKBUS is inactive (High), the counters are held clear and, consequently, are effectively disabled. When LOCKBUS is asserted active (Low), the counters are enabled and the TOC signal will go High 64 CPU clock periods later. (TOC may also be connected to other outputs of Counter/Timer 138, e.g., if connected to the QB output of the second half of the Counter/Timer, TOC will go High 32 CPU clock periods after LOCKBUS is asserted active.)

Referring to Table-1A, an examination of the equation for LOCKBUS shows that, assuming that LOCKEN is enabled High, the first group of three terms asserts LOCKBUS active (Low) immediately after HLDREQ goes inactive (Low). (Immediately after HLDREQ goes inactive Low, BCKOFF will still be active Low). The second group of three terms holds LOCKBUS active (Low) until either a predetermined period of time has elapsed (i.e., TOC goes High), or the CPU has been idle for two consecutive clock samples (i.e., IDLE goes Low).

The LOCKBUS term is then used in the BCKOFF equation to prevent a processor hold as long as LOCKBUS remains active. A quick examination of the equation for BCKOFF shows that the LOCKBUS term appears in each of the first three groups of terms. But, BCKOFF can only be asserted active (Low) if all of the conditions are meet in any one of the first three term groups (the fourth group of terms merely returns BCKOFF inactive when HLDREQ becomes inactive). Consequently, BCKOFF can not be asserted active (Low) as long as LOCKBUS is active (Low). Thus, as long as LOCKBUS is asserted active (Low), processor 102 controls the bus, or, in other words, the processor is "locked" to the bus.

Referring to the BCKOFF equation, the first group of seven terms will cause BCKOFF to be driven active (Low) at the end of any non-cacheable bus cycle. Thus, this group of terms is responsible for breaking up the previously mentioned slow 16 byte atomic transfers (because these slow transfers are from non-cacheable memory). This group of terms will also drive BCKOFF active at the end of normal I/O bus cycles. Since this first group of terms waits for the end of the current bus cycle (the first term group requires CPURDY to be active Low to drive BCKOFF active), it maintains single bus transfers as atomic units.

The second group of seven terms in the BCKOFF equation drives BCKOFF active (Low) at the end of cacheable bus cycles. In the preferred embodiment, cacheable memory must be defined as 32 bit data widths. Thus, it is guaranteed that these transfers will only require four (4) external bus cycles to complete, or about 2 microseconds (4 transfers×0.5 microseconds/transfer=2 microseconds).

The third group of terms in the BCKOFF equation will drive BCKOFF active if the local CPU bus is currently inactive. And the fourth group of terms maintains BCKOFF active until HLDREQ is returned inactive.

In the equation for HLDACK (hold acknowledge), the first group of three terms drives HLDACK active (High) one clock period after BCKOFF is driven active (Low). And the second group of two terms holds HLDACK active until HLDREQ is returned inactive.

TABLE 1-A

| PAL Equations | |
|---|---|
| !BCKOFF | := (BCKOFF & HLDREQ & !BUSCYC & CACHABLE & !CPURDY & CPULOCK & LOCKBUS) or<br>(BCKOFF & HLDREQ & !CACHABLE & !BRSTLAST & !BRSTRDY & CPULOCK & LOCKBUS) or<br>(BCKOFF & HLDREQ & BUSCYC & ADSTS & CPULOCK & LOCKBUS) or<br>(!BCKOFF & HLDREQ) |
| HLDACK | := (!BCKOFF & HLDREQ & !HLDACK) or<br>(HLDACK & HLDREQ) |
| !LOCKBUS | := (!HLDREQ & !BCKOFF & LOCKEN) or<br>(!LOCKBUS & !TOC & IDLE) |
| !IDLESAMP | := (IDLESAMP & ADSTS & BUSCYC & (!LOCKBUS & TIC & !TICDLY) or<br>(IDLESAMP & ADSTS & BUSCYC & !LOCKBUS & !TIC & TICDLY) or |

TABLE 1-A-continued

PAL Equations

| | |
|---|---|
| !IDLE | := (!IDLESAMP & ADSTS & BUSCYC & !LOCKBUS) or (!IDLESAMP & ADSTS & BUSCYC & !LOCKBUS & TIC & !TICDLY) or (!IDLESAMP & ADSTS & BUSCYC & !LOCKBUS & !TIC & TICDLY) |
| !TICDLY | := TIC |
| !BUSCYC | := (!ADSTS & !RESET & BCKOFF) or (!BUSCYC & CPURDY & BRSTRDY & !RESET) or (!BUSCYC & CPURDY & BRSTLAST & !RESET) |
| !CACHABLE | := (!BUSCYC & !W/R & M/IO & !PCD & !KEN & !RESET & CPULOCK & CACHABLE) or (!CACHABLE & CPURDY & BRSTRDY & !KEN & !RESET) or (!CACHABLE & CPURDY & BRSTLAST & !KEN & !RESET) |
| !CPURDY | !BUSCYCDLY & !BUSRDY & CACHABLE & !BUSCYC |
| !BRSTRDY | !BUSCYCDLY & !BUSRDY & !CACHABLE |
| !BUSCYCDLY | := !BUSCYC |
| !KEN | = KENA & !ENCACHE & !BUSCYC |
| !KENA | = (M/IO & !A31 & !A26 & !A25 & !A24 & !A23 & !A22 & !A21 & !A20 & A19 & !A18 & A17) or (M/IO & !A31 & !A26 & !A25 & !A24 & !A23 & !A22 & !A21 & !A20 & A19 & A18 & !A17) or (M/IO & A31) or (M/IO & !ROMEN & !A31 & !A26 & !A25 & !A24 & !A23 & !A22 & !A21 & !A20 & A19 & A18 & A17) or (!M/IO) or (M/IO & !A31 & !A26 & !A25 & !A24 & A23 & CEN0) |

Symbol Definitions

The symbols listed below have the following definitions throughout the specification and claims:

| Symbol | Definition |
|---|---|
| ! | Logical NOT, i.e., logical inversion |
| & | Logical AND |
| or | Logical OR |
| := | "Synchronous Equals". This symbol implies that the term on the left side of the equation is clocked on an edge of the CPU clock. In other words, during any given CPU clock period, the logical state of the term on the left side of the equation is equal to the expression on the right side of the equation when the terms in the right-hand expression are evaluated at (more precisely, immediately before) the clock edge at the beginning of the clock period. |
| = | "Asynchronous Equals". This symbol implies its usual meaning, i.e., that the term on the left side of the equation is equal to the expression on the right side of the equation. No clocking is implied. |

TABLE 1-B

Signal Definitions

| | |
|---|---|
| NOTE: | A definition appearing in parenthesis at the beginning of a paragraph is an Intel processor pin definition, and it indicates that the corresponding signal is connected to this processor pin. (E.g., signal ADSTS is connected to processor pin ADS.) |
| ADSTS | (ADS) "Address Status". Active Low. |

TABLE 1-B-continued

Signal Definitions

| | |
|---|---|
| | This CPU output indicates that the address and bus cycle definition (e.g., W/R, M/IO etc.) signals are valid. |
| Axx | (Axx) "Address xx". The CPU address line number "xx". |
| BCKOFF | (BOFF) Active Low. This PAL output/CPU input causes the CPU to immediately release control of the bus, i.e., to "float" the bus. |
| BRSTLAST | (BLAST) "Burst Last". Active Low. This CPU output indicates that the burst bus cycle (multiple cycle data transfer) is complete the next time the BRSTRDY input is asserted active. |
| BRSTRDY | (BRDY) "Burst Ready". Active Low. This PAL output/CPU input indicates that the external system has placed valid data on the bus in response to a read request, or accepted data from the bus in response to a write request from the CPU. This signal performs the same function during a burst cycle that CPURDY performs during a non-burst cycle. |
| BUSCYC | "Bus Cycle". Active Low. This signal is generated by the PAL for its own internal use. BUSCYC indicates that the CPU is currently executing an external bus cycle. |
| BUSCYCDLY | The BUSCYC signal delayed by one CPU clock period. |
| BUSRDY | This PAL input from the external system indicates that valid data has been placed on the bus in response to a read request, or that data has been accepted in response to a write request. BUSRDY does not differentiate between burst and non-burst data transfers. BUSRDY is typically one of the control lines on the CPU bus. |
| CACHABLE | Active Low. CACHABLE is generated by the PAL for its own internal use and it indicates that a cacheable memory read cycle is currently being executed by the CPU. |
| CEN0 | This PAL input from a planar I/O device enables the caching of address locations in the range of 8 to 16 Megabytes when active (Low). |
| CPULOCK | (LOCK). Active Low. This CPU output indicates that the CPU is running a read-modify-write cycle and that the bus should not be released from the CPU when CPULOCK is active. |
| CPURDY | (RDY) "CPU Ready". Active Low. This PAL output/CPU input indicates that the external system has placed valid data on the bus in response to a read request, or that the external system has accepted data from the bus in response to a write request from the CPU. This signal performs the same function during a non-burst cycle that BRSTRDY performs during a burst cycle. |
| ENCACHE | This PAL input from a planar I/O device unconditionally disables caching when High. |
| HLDACK | "Hold Acknowledge". Active High. This PAL output indicates to external systems that the CPU has been released from the bus. |
| HLDREQ | "Hold Request". Active High. This PAL input signal is set active by an external system (e.g., another bus master) when that external system needs the CPU to release control of the bus. |
| IDLE | Active Low. This signal is used internally by the PAL, and it is active when the CPU has been idle for two consecutive idle samples. |
| IDLESAMP | "Idle Sample". Active Low. The PAL samples the state of the CPU at the |

TABLE 1-B-continued

Signal Definitions

| | |
|---|---|
| | rising and falling edges of TIC and, if the CPU is idle and locked to the bus, IDLESAMP is active. |
| KEN | (KEN) "Cache Enable". Active Low. If this PAL output/CPU input is active and the current CPU cycle can be cached, the current cycle will be converted into a cache line fill cycle. |
| KENA | "Cache Enable Alternate". A subset of the KEN signal. |
| LOCKBUS | Active Low. This signal is produced by the PAL and the Lockbus Counter/Timer. When the CPU is not idle, LOCKBUS establishes a minimum amount of time that the CPU is locked to the bus. |
| LOCKEN | "Lock Bus Enable". This PAL input signal originates from an external planar I/O device, which may be driven under program control. When active (High) this signal enables the lockbus function. |
| M/IO | (M/IO) "Memory/Input-Output". This bus cycle definition signal is a CPU output that indicates a memory cycle when High, and an Input/Output cycle when Low. |
| PCD | (PCD) "Page Cache Disable". Active High. This CPU output indicates that the current address is not internally cacheable. |
| RESET | Active High. This CPU input forces the CPU to begin program execution at a predetermined address and known state. |
| ROMEN | This PAL input from a planar I/O device enables the caching of ROM addresses within the range of $E0000-$FFFFF when active (High). |
| TIC | This is a Lockbus Counter/Timer output signal that is enabled whenever LOCKBUS is active (Low). Its frequency is equal to the CPU clock frequency divided by 16. |
| TICDLY | "Tic Delayed". The TIC signal delayed by one CPU clock period. |
| TOC | This output of the Lockbus Counter/Timer goes high a predetermined number of clock cycles (e.g., 32 or 64) after the Lockbus Counter is enabled. This signal is used to timeout the lockbus feature. |
| W/R | (W/R) "Write/Read". This bus cycle definition signal is a CPU output that indicates a write cycle when High, and a read cycle when Low. |

We claim as our invention:

1. A hold and lock circuit, for use with a computer bus and a processor having an hold input port for receiving a hold signal, the processor being electrically coupled to the computer bus when the hold signal is in an inactive state, and decoupled from the bus when the hold signal is in an active state, said hold and lock circuit comprising in combination:

a hold output port for sending a hold signal to said processor, said hold output port being connectable to said hold input port of said processor;

a hold request input port for receiving a hold request signal;

means for sending a hold request signal to said hold request input port;

bus locking means, coupled between said hold output port and said hold request input port, for locking said hold signal in an inactive state in response to a change in said hold request signal from an active to an inactive state; and first bus unlocking means, coupled between said hold output port and said hold request input port, for unlocking said hold signal from the inactive state at a predetermined period of time after said hold request signal changes from the active to the inactive state, said predetermined period of time having a beginning and an end.

2. The hold and lock circuit of claim 1, including second bus unlocking means, coupled between said hold output port and said hold request input port, for unlocking said hold signal from the inactive state after a predetermined number of idle processor clock cycles following the change of said hold request signal from the active to the inactive state, said predetermined number of idle processor clock cycles having a beginning and an end.

3. The hold and lock circuit of claim 2, including means, coupled between said hold output port and said hold request input port, for generating a lockbus signal, said hold signal being held in the inactive state in response to an active lockbus signal, said lockbus signal being in an active state in response to an active hold request signal and an active hold signal, or an active lockbus signal and an inactive timer signal and an inactive idle signal during a previous clock cycle of the processor, wherein said timer signal is active at the end of said predetermined period of time, and said idle signal is active at the end of said predetermined number of idle processor clock cycles.

4. The hold and lock circuit of claim 3, including a timer circuit having an input for receiving said lockbus signal, said timer circuit being enabled when said lockbus signal is active, said timer circuit having an output for said timer signal.

5. The hold and lock circuit of claim 4, including means for generating a hold acknowledge signal, said hold acknowledge signal being active in response to active hold and hold request signals, said means for generating a hold acknowledge signal being coupled to said hold output port and said hold request input port.

6. The hold and lock circuit of claim 1, including means, coupled between said hold output port and said hold request input port, for generating a lockbus signal, said hold signal being held in the inactive state in response to an active lockbus signal, said lockbus signal being in an active state in response to an active hold request signal and an active hold signal, or an active lockbus signal and an inactive timer signal during a previous processor clock cycle, wherein said timer signal is active at the end of said predetermined period of time.

7. The hold and lock circuit of claim 6, including a timer circuit having an input for receiving said lockbus signal, said timer being enabled when said lockbus signal is active, said timer circuit having an output for said timer signal.

8. The hold and lock circuit of claim 7, including means, coupled between said hold output port and said hold request input port, for generating a hold acknowledge signal, said hold acknowledge signal being active in response to active hold and hold request signals.

9. A computer system comprising in combination:

a computer bus;

a processor having a hold input port, said processor being electrically coupled to said bus in response to a signal at said hold input port in an inactive state, and said processor being electrically decoupled from said bus in response to a signal at said hold input port in an active state;

hold and lock circuitry having a hold request input port, said hold and lock circuitry sending a hold signal to said hold input port of said processor, said hold signal being locked in the inactive state in response to a change in the state of a signal at said hold request input port from an active to an inactive state, such that said processor is coupled to said bus when said hold signal is locked in the inactive state;

said hold and lock circuitry including first means, coupled between said hold output port and said hold request input port, for unlocking said hold signal from the inactive state at a predetermined period of time after the signal at said hold request input port changes from the active to the inactive state, said predetermined period of time having a beginning and an end, said first means for unlocking said hold signal being coupled to said hold request input port; and means for sending a hold request signal to said hold request input port of said hold and lock circuitry.

10. The computer system of claim 9, wherein said hold and lock circuitry includes second means, coupled between said hold output port and said hold request input port, for unlocking said hold signal from the inactive state after a predetermined number of idle processor clock cycles following the change of said hold request signal from the active to the inactive state, said predetermined number of processor clock cycles having a beginning and an end.

11. The computer system of claim 10, wherein said hold and lock circuitry includes means, coupled between said hold output port and said hold request input port, for generating a lockbus signal, said hold signal being held in the inactive state in response to an active lockbus signal, said lockbus signal being in an active state in response to an active hold request signal and an active hold signal, or an active lockbus signal and an inactive timer signal and an inactive idle signal during a previous clock cycle, wherein said timer signal is in an active state at the end of said predetermined period of time, and said idle signal is active at the end of said predetermined number of idle processor clock cycles.

12. The computer system of claim 11, wherein said hold and lock circuitry includes a timer circuit having an input for receiving said lockbus signal, said timer circuit being enabled when said lockbus signal is active, said timer circuit having an output for said timer signal.

13. The computer system of claim 12, wherein said hold and lock circuitry includes means, coupled between said hold output port and said hold request input port, for generating a hold acknowledge signal, said hold acknowledge signal being active in response to active hold and hold request signals.

14. The computer system of claim 9, wherein said hold and lock circuitry includes means, coupled between said hold output port and said hold request input port, for generating a lockbus signal, said hold signal being held in the inactive state in response to an active lockbus signal, said lockbus signal being in an active state in response to an active hold request signal and an active hold signal, or an active lockbus signal and an inactive timer signal during a previous clock cycle, wherein said timer signal is active at the end of said predetermined period of time.

15. The computer system of claim 14, wherein said hold and lock circuitry includes a timer circuit having an input for receiving said lockbus signal, said timer being enabled when said lockbus signal is active, said timer circuit having an output for said timer signal.

16. The computer system of claim 15, wherein said hold and lock circuitry includes means, coupled between said hold output port and said hold request input port, for generating a hold acknowledge signal, said hold acknowledge signal being active in response to active hold and hold request signals.

* * * * *